Oct. 11, 1932.  H. M. ROCKWELL  1,882,259
STOP LIGHT SWITCH AND BRAKE SYSTEM FOR VEHICLES
Filed May 28, 1927   3 Sheets-Sheet 1
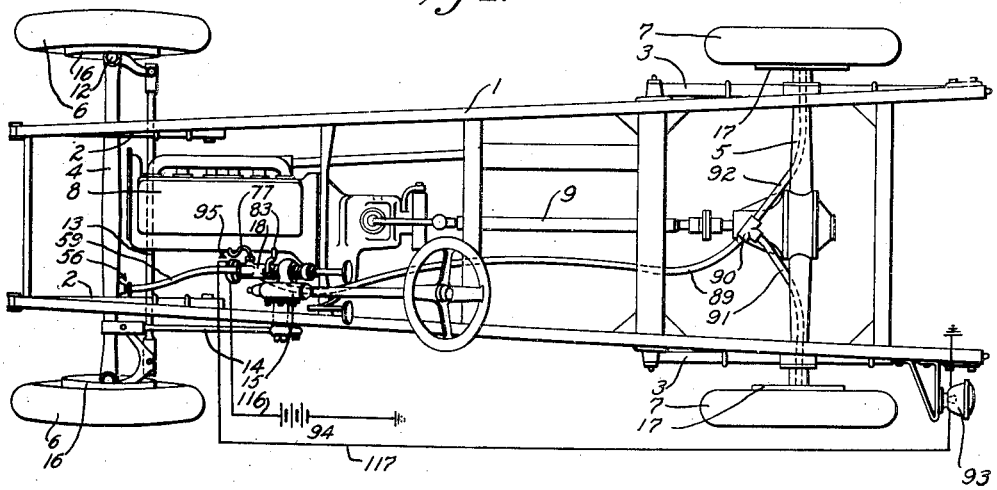
Fig.1.
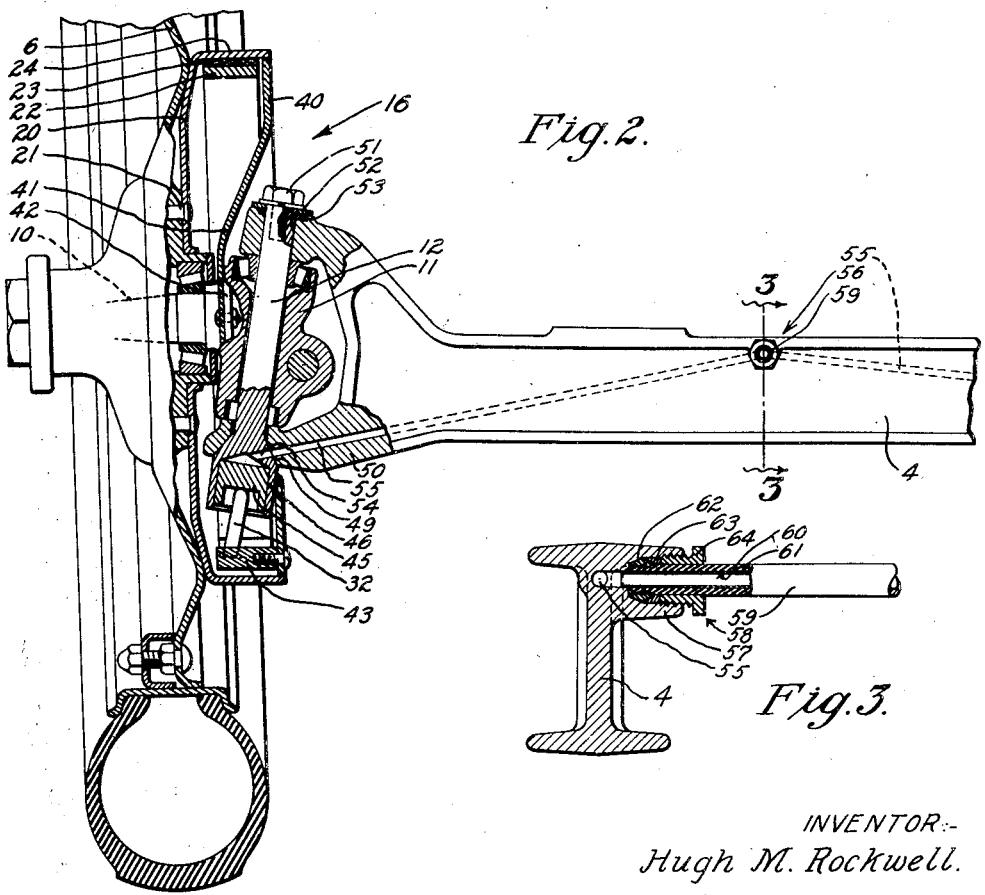
Fig.2.
Fig.3.
INVENTOR:-
Hugh M. Rockwell.
By his Attorney
George L. Ljunglof Oct. 11, 1932.    H. M. ROCKWELL    1,882,259
STOP LIGHT SWITCH AND BRAKE SYSTEM FOR VEHICLES
Filed May 28, 1927    3 Sheets-Sheet 2
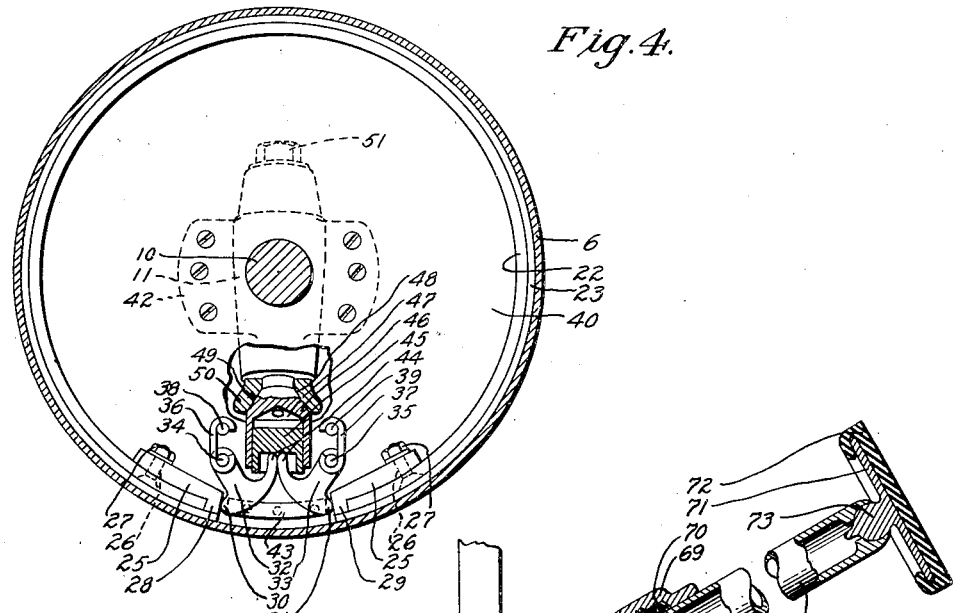
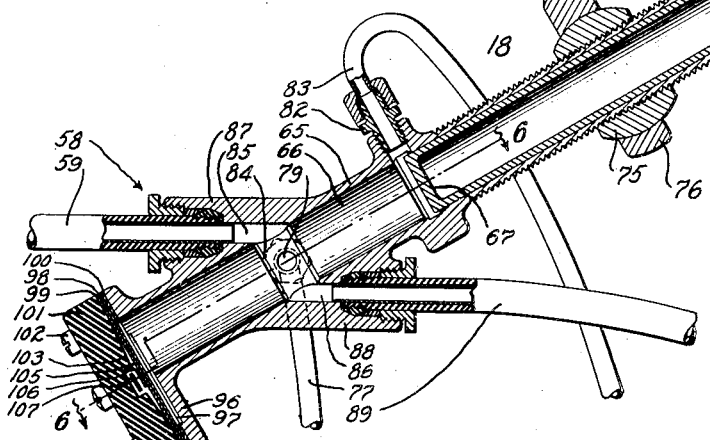
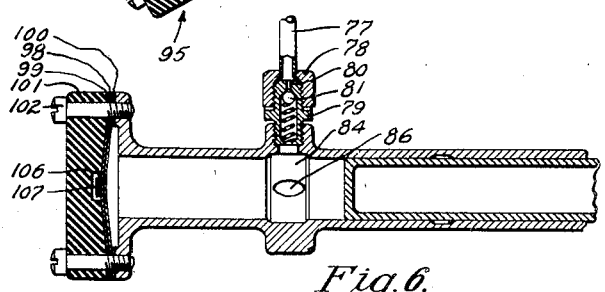
INVENTOR:-
Hugh M. Rockwell.
By his Attorney
George L. Ljungloj

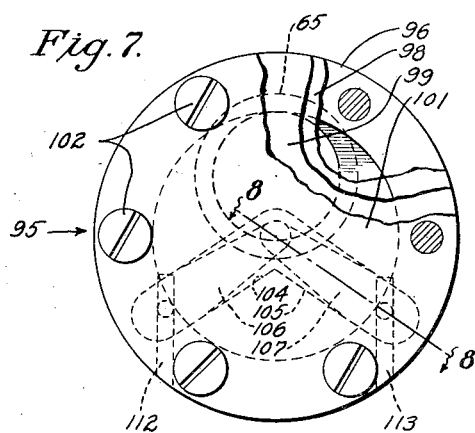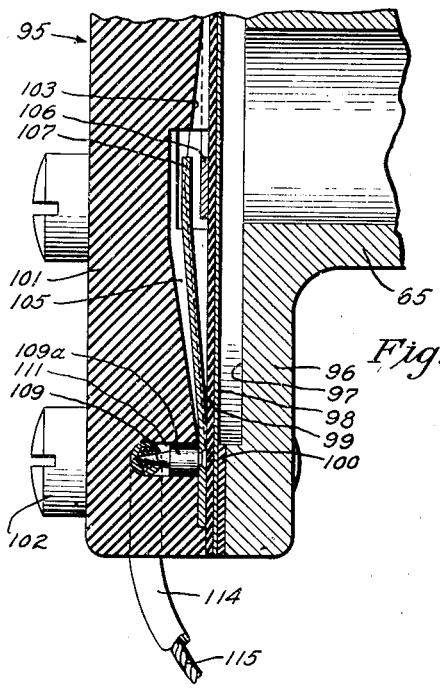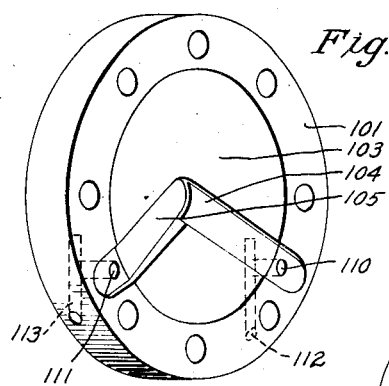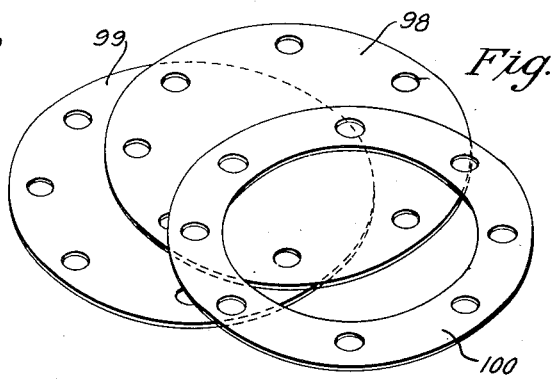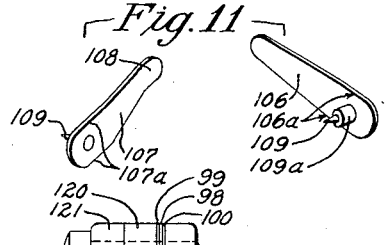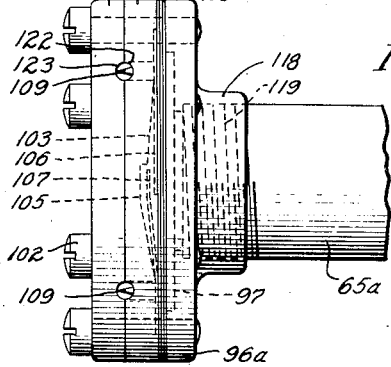
INVENTOR:-
Hugh M. Rockwell.
By his Attorney Patented Oct. 11, 1932

1,882,259

UNITED STATES PATENT OFFICE

HUGH M. ROCKWELL, OF NEW YORK, N. Y.

STOP LIGHT SWITCH AND BRAKE SYSTEM FOR VEHICLES

Application filed May 28, 1927. Serial No. 195,107.

This invention relates generally to motor vehicles and the like, and has particular reference to means for connecting a stop signal with the brake system of the vehicle in such a manner that the signal will at all times operate in proper synchronism with the braking forces in the brake system.

Many different types of stop signal lights have been provided for use on motor vehicles, whereby drivers may give warning to those behind them that they are about to stop, or that they are about to considerably reduce their speed of travel, and in order to render such signals automatic, they have been connected for actuation with the brakes of the vehicle. Such signals usually include an electric lamp mounted at the rear of the vehicle, current being supplied to the lamp through the instrumentality of a suitable switch which is mechanically connected by links, levers, etc., with the brake pedal. It is essential that the stop signal be made at the time that the brakes commence to take effect, but difficulties have arisen due to lost motion caused by wear or slack in the parts. The brakes and their operating mechanism require adjustments from time to time to compensate for wear, stretching, and the like, and if the connections for the stop light switch are not accurately adjusted accordingly, the light will not thereafter be synchronized with the braking forces. In some cases the stop signal is not given until the brake pedal has been depressed sufficiently to cause locking of the wheels, and from this extreme, the conditions range to the opposite extreme in which the signal is given by what is known as "riding the brake pedal". These difficulties have been experienced in fluid pressure brake systems, (hydraulic, air, and vacuum,) as well as in the mechanical systems, and said difficulties are overcome by the present invention in connection with fluid pressure brake systems which are becoming increasingly popular.

I have devised an improved hydraulic brake system for motor vehicles, wherein there will be a thorough venting of the system, giving freedom from air pockets and resultant lost motion. For the purpose of illustration, I have shown my improved stop light switch in combination with my improved hydraulic brake system, but the novel features of said brake system are not claimed herein, they being made the subject matter of a separate application bearing Ser. No. 218,656, filed Sept. 10, 1927. It is to be understood, however, that the novel switch and its arrangement as claimed herein, is not restricted to use with my said novel hydraulic brake system, but may be employed in conjunction with any other fluid pressure system desired, and regardless of whether power is applied by foot, or otherwise.

An important object of this invention is to provide, in a vehicle with fluid-pressure brakes, a stop light switch having actuating means disposed in the braking system.

Another object of the invention is to provide such an arrangement whereby the stop signal is at all times synchronized with the braking forces.

Another object is to provide a stop light switch which is especially adapted for use with a fluid pressure braking system in which the foot pedal is mounted directly upon the end of the piston rod of the master cylinder.

Another object is to provide a switch of the above mentioned character which will be especially well adapted for use with hydraulic brake systems, and capable of being connected at any desired or convenient point in the hydraulic line.

Another object is to provide such a switch with novel and simplified means for connecting the necessary electrical conductors to the switch contacts.

Another object is to provide a novel stop light switch which will be extremely simple in construction, strong and durable in service, economical to manufacture, and a substantial advance in the art.

With these and other objects in view, the invention resides in the details of construction, combinations, and arrangements of parts hereinafter set forth, shown by way of illustration in the accompanying drawings, and specifically pointed out in the appended claims.

In the drawings,

Figure 1 is a diagrammatic plan view of a motor vehicle chassis with my improved hydraulic braking system, and stop light switch of this invention;

Fig. 2 is a fragmentary vertical transverse sectional view through one of the front wheel mountings of the vehicle;

Fig. 3 is a transverse sectional view through the front axle, the section being taken on line 3—3 of Fig. 2;

Fig. 4 is a substantially vertical longitudinal sectional view on line 4—4 of Fig. 2, with parts broken away;

Fig. 5 is a vertical longitudinal sectional view through the novel stop light switch in association with one form of my improved master cylinder;

Fig. 6 is a fragmentary longitudinal sectional view on line 6—6 of Fig. 5, with the parts shown in different relative positions;

Fig. 7 is an end elevation of the switch and cylinder shown in Fig. 5, parts being broken away;

Fig. 8 is a fragmentary sectional view on line 8—8 of Fig. 7, and drawn on a larger scale;

Fig. 9 is a detail perspective view of the dielectric clamping plate of the improved switch;

Fig. 10 is a detail perspective view of the yieldable diaphragm with its insulator and gasket;

Fig. 11 is a detail perspective view of the separated switch contact members per se; and Fig. 12 is a bottom plan view of a slightly modified form of switch.

The invention is applicable to various types of wheeled vehicles, and has been shown in Fig. 1 in association with an automobile chassis, which includes a chassis frame 1 resiliently supported by springs 2 and 3 on front and rear axle 4 and 5 respectively, the front axle 4 having the usual steering wheels 6, and the rear axle 5 having the driving wheels 7. Power is supplied to the rear wheels 7 from a motor 8, through a propeller shaft 9 in connection with the internal mechanism of the rear axle 5, said rear axle having a hollow tubular casing of any ordinary or preferred form. The front wheels 6 are rotatable on spindles 10 which extend outwardly from steering knuckles 11, said steering knuckles being adjustable about the axes of the king pins 12 at the ends of the front axle 4, and the steering being accomplished by links 13 and 14, operable by a steering gear 15.

In the illustrated disclosure, the vehicle has been shown as equipped with my improved four-wheel hydraulic brake system, which, as above stated, is not claimed herein, but is covered by a separate application for Letters Patent. In this improved braking system, the front and rear wheels are respectively provided with brakes 16 and 17, which are operated by suitable fluid, under pressure, supplied from a master cylinder 18. The fluid employed is preferably oil, and the master cylinder is mounted in a fixed position above the axles, while the brake cylinders (hereinafter described) are located below the axles, and the arrangement is such that the entire system will be self-venting and substantially free from air pockets.

Referring particularly to Figures 2, 3, and 4, it will be seen that each of the front wheel brakes 16 includes a hollow brake drum 20 secured as by rivets or bolts 21 to the wheel 6, and within the drum 20 is an expansible brake band 22 having on its outer surface a suitable facing or lining of friction material 23 for engagement against the inner periphery of the cylindrical flange portion 24 of the brake drum 20. The brake band 22 is in the form of a split band of spring steel, or the like, tending to retract by virtue of its inherent resiliency, and has each of its ends provided with a suitable reinforcing block 25 secured by bolts 26 and nuts 27, or other desired fastening elements. The proportions of the parts are such that the opposed reinforced ends 28 and 29 of the brake band 22 are spaced apart as best shown in Fig. 4, and are respectively engaged by the heel portions 30 and 31 of actuating levers 32 and 33, which are pivoted at 34 and 35 to the free ends of links 36 and 37, said links in turn being pivotally supported on fixed pins 38 and 39 extending inwardly from a stationary mounting and dust plate 40. The plate 40 is circular in outline to correspond with the brake drum 20, and has a central indented portion 41 secured to lateral flanges 42 of the steering knuckles 11 whereby to be held firmly in stationary position. The brake band is maintained in a floating, self-energizing position by means of a block 43 which is secured to the inner surface of the plate 40 in such a manner as to constitute an abutment for one or the other of the ends 28 and 29 of the band 22, and the suspension of the levers 32 and 33 on the links 36 and 37 affords compensation for the slight shifting of the brake band in the reverse directions of rotation of the brake drum.

The levers 32 and 33 are further characterized by toe portions 44 which extend upwardly and bear against the lower side of a piston 45 which is reciprocable in a brake cylinder 46, and said toe portions 44 have their opposing edges formed arcuately whereby to be capable of constant engagement. This construction equalizes the thrust and distributes the braking forces to both levers of the brake. In order to simplify the construction of the brakes and to avoid impairment of the steering mechanism, the cylinder 46 is coaxial with the king pin 12, and in the preferred form, said cylinder is integral with said king pin, being provided as an enlarged head member at the lower end of the king pin, and having a bored recess 47 for the reception of the piston 45. Joining said head portion or cylinder 46 with the shank portion of the king pin 12 is a tapered shoulder 48 which takes a seat in a ground countersink 49 in the lower portion 50 of the forked end of the axle 4, and the king pin is held in place by a cap screw 51 and thrust washer 52, and is prevented from rotating by means of a key washer 53.

Extending inwardly from an appropriate point in the tapered shoulder 48 is a port 54 which communicates at its inner end with the interior of the cylinder 46, and at its outer end with an inclined hole 55 in the axle 4. In a forged axle as shown, said hole may be drilled, while in the case of a tubular axle, a pipe or tube may be disposed within the axle. There are, of course, two holes or passages 55, one extending inwardly from each end of the axle, and said holes intersect at a suitable point 56 adjacent which the axle may be provided with a rearwardly disposed boss 57. Said boss 57 is drilled and counterbored substantially as shown in Fig. 3 for a coupling 58 of a flexible hose 59 which extends from the master cylinder 18. The hose 59 may be of any ordinary or preferred form, that illustrated having a flexible metallic inner lining 60 with a covering 61 of rubber, vulcanized fabric, or the like. The coupling 58 includes a lead bushing 62 which provides an oil-proof joint and at the same time firmly clamps the tube covering 61, and a packing 63 which is forced against said bushing by means of a gland nut 64.

Referring now particularly to Figs. 5 and 6, it will be seen that the master cylinder 18 comprises a tubular body 65, preferably made as a casting, having a smooth, cylindrical bore 66, within which is fitted a plunger or piston 67, capable of reciprocation. The outer or upper end of the plunger is of a reduced diameter to provide a piston rod 68 which slides through a packing gland 69 and a stop ring 69a, a tight joint being maintained by means of packing 70, and said rod 68 carries at its outer extremity a pedal member 71 covered by a rubber pad 72. The pedal member 71 may be connected in any suitable manner to the rod 68, that shown in the drawings having a ball joint 73 which permits universal movement within practical limits. The cylinder 18 is preferably disposed at an angle as shown in Fig. 5, the degree of inclination being dependent upon the particular installation, and in order to adjust the same longitudinally, the outer surface of the body portion 65 is threaded as at 74 for the accommodation of a ball nut 75. The ball nut 75 is adapted to be firmly but adjustably clamped in a suitable bracket 76, which may be secured to the inner side of the dash, or to the steering gear housing or other suitable member of the vehicle chassis, said ball nut and bracket being split to permit simultaneous clamping of the nut and the cylinder.

The lower end of the cylinder body 65 has a slightly larger internal diameter (clearance for the piston) and is suitably closed in opposition to the plunger or piston 67, and this operative portion of the cylinder is filled with oil or other fluid capable of transmitting pressure. The oil may be fed by gravity from a suitable reservoir mounted above the cylinder, or it may be supplied through a tube 77 from the pressure lubricating system of the motor 8, as illustrated. The tube 77 communicates with the cylinder bore 66 adjacent the lower end of the stroke of the plunger 67, and is fitted with a coupling 78 for connection to a nipple 79 in the body 65. The nipple 79 has a restricted orifice 80 through which the oil may flow inwardly, and disposed within said nipple is a check valve 81 which prevents return of the oil to the tube 77 when the plunger 67 is moved downwardly. Adjacent the upper end of the stroke of the piston, the cylinder body 65 is fitted with another nipple 82 to which a tube 83 is connected, said tube 83 constituting a return line to the engine crank case. At the point of entry of the nipple 79, the wall of the cylinder is provided with an annular groove 84 at the upper side of which is a forwardly extending port 85, and at the lower side a rearwardly extending port 86. The port 85 is formed in a boss 87 adapted to receive the rear end of the fluid conducting hose 59, it being joined thereto by means of a coupling 58 similar in all respects to that previously described in connection with Fig. 3. In the same way the port 86 is formed in a boss 88 adapted to receive the front end of a rearwardly extending hose 89 which transmits the pressure fluid to the rear brakes 17.

The normal position of the plunger 67 is shown in Fig. 5, and in this condition the entire braking system, including the individual brake cylinders 45, the master cylinder chamber 66, and the conduits connecting the same, are filled with oil. As the operator presses downwardly on the pedal 71, the plunger 67 is caused to move longitudinally in the cylinder bore 66 (as shown in Fig. 6) setting up a pressure in the fluid, said pressure being transmitted equally to the individual brake cylinders, whereby to expand the brake bands and engage them against the inner peripheries of the brake drums.

The hose 89 slopes downwardly and rearwardly to a T connection 90 adjacent the differential housing of the rear axle, from which branch tubes 91 and 92 go out to the rear wheel brakes at the opposite sides of the car, said branches preferably extending into and being guided laterally through the tubular portions of the rear axle. It is, of course, to be understood that the rear brakes 17 are substantially the same as the front brakes 16, with the exception that the rear brake cylinders are mounted upon the brake drum plate 40, instead of on the king pins. The hose members have a sufficient slack to allow movement of the chassis frame 1 relative to the axles 4 and 5 without straining said hose members or their couplings.

A stop light 93 is mounted at the rear of the vehicle, current being supplied to it from a battery 94 each time that the brakes are applied. This requires a normally open switch which will be closed when the brake pedal is depressed, and it has not been found convenient to apply a switch of ordinary construction to a device as disclosed herein, in which the pedal is mounted directly on the piston rod of the master cylinder. I have solved this problem by providing a novel fluid actuated switch 95 which synchronizes the signal with the braking forces, and makes possible adjustments of the brakes without affecting such synchronism.

As illustrated in Figs. 5 to 11 inclusive, the switch 95 is directly associated with the master cylinder 18, the body portion 65 of which has an eccentrically disposed annular flange 96 at its lower end. Said flange 96 is formed with a counterbore 97 which is substantially tangent with the bore 66 at its upper edge, and forms a fluid chamber of larger area than the cross-section of the cylinder. A yieldable diaphram 98 forms a wall or closure for said fluid chamber, said diaphram being in the nature of a resilient steel disk (Fig. 10) covered on its outer side by a disk 99 of bakelite, fiber, or other dielectric material, and provided on its inner side with a gasket 100 to prevent leakage of the oil from the cylinder. Said diaphram 98, disk 99, and gasket 100 are clamped in position against the flange 96 by means of a block or plate 101 of insulation material held by screws 102. The block 101 is best shown in Fig. 9, and may be conveniently formed of bakelite or the like, and has its inner surface provided with a shallow conical or spherical recess 103 to permit movement of the diaphram and to limit said movement, the bottom of said recess forming a seat for the disk 99 when pressure is applied. In addition to this recess 103, the inner face of the block 101 is formed with two radial grooves 104 and 105 which diverge from the center of the recess 103, and which are of varying depths as shown.

A pair of switch contacts 106 and 107 are disposed in said grooves 104 and 105, said contacts being formed of resilient sheet metal, and the contact 106 being flat whereby to bear against the outer side of the insulation disk 99, while the contact 107 has an offset portion 108 which is normally separated or spaced from the overlapping end of the contact 106 (Figs. 5 and 8). Each of the contacts 106 and 107 carries a relatively sharp spike 109, extending perpendicularly from the outer surface of the body of sheet metal and adapted to be disposed in one or the other of the holes 110 and 111 in the insulation block 101. Each of the spikes 109 has a cylindrical barrel portion 109a fitting snugly in the hole 110 or 111, whereby to accurately locate the contacts 106 and 107 in the block 101 and to prevent their displacement longitudinally, and the side edges 106a and 107a fit snugly in the grooves 104 and 105 respectively, to maintain the contacts against lateral displacement. An additional pair of holes 112 and 113 extend inwardly from the lower edge of the block 101 to intersect the holes 110 and 111, respectively, into which the ends of insulated wires may be inserted. The arrangement is such that the sharpened ends of the spikes 109 extend into the holes 112 and 113 in such a manner as to pierce the insulation 114 and form electrical contact with the stranded wire 115, adjacent the end thereof. In so doing, the stranded wires and their insulation are expanded against the walls of the holes 112 and 113, and thereby firmly held in place. It will be evident from this that the switch contacts 106 and 107 may be very quickly, and in fact, automatically connected to the electrical conductors 116 and 117 necessary to complete the circuit between the battery and the stop light 93, and that said contacts are firmly clamped in position by the block 101 against the insulation disk 99. The wire terminals are entirely within the confines of the block 101 and thoroughly protected from moisture, dirt, and short circuiting, and are so positively held as to be practically incapable of jarring loose due to vibrations of the vehicle.

As braking pressure is applied through the fluid, the diaphragm 98 and its insulating disk 99 are forced against the block 101, as best shown in Fig. 6, and in such movement the free end of the contact member 106 is moved toward and into engagement with the offset portion of the contact member 107. Thus the normally open circuit is closed, permitting the current to flow from the battery 94 through the conductors 116 and 117 to the stop light 93. When the pedal 71 is subsequently released, the fluid within the entire system expands, returning the plunger 67 to its upper position in the master cylinder, and permitting the return of the diaphragm 98, insulation disk 99, and contact member 106 to their normal positions. At the beginning of the downward movement of the plunger, the diaphragm 98 will offer a slight resistance to the pressure of the fluid, sufficient to prevent the making of the contact by what is known as "riding the pedal". Said diaphragm will resist the slight normal pressures which have no braking effect, yet it will positively make the contact whenever the pedal is depressed sufficiently to exert a braking pressure in the system.

The diaphragm 98 has been illustrated and described as being larger in area than the plunger, but such a difference is not necessary in all cases. In my preferred form of master cylinder, the plunger is of such a relatively small diameter that it is desirable to have a larger size diaphragm in order to obtain a sufficient amplitude of movement, but of course, with a larger cylinder and piston, the diaphragm may be of the same diameter. Furthermore, the counterbore 97, which defines the active portion of the diaphragm has been disclosed as being tangent to the cylinder bore 66 at its upper edge, and this feature is important in that it prevents the formation of an air pocket, and thus eliminates lost motion.

In Fig. 12, a slightly modified form of the invention has been shown, the flange 96a being made as a separate part, and having a boss 118 which is internally threaded as at 119, for connection to the threaded lower end of a plain cylinder body 65a. It is, of course, not necessary to mount the diaphragm 98 in opposition to the plunger, since in some forms of the invention it will be mounted at one side of the cylinder adjacent the lower end thereof, and in other forms, it may be conveniently connected at some point in the tube 89, away from the cylinder. By forming the flange 96a, which is, in effect, a casing, separately as shown in Fig. 12, the remote positioning of the switch with reference to the master cylinder, is made possible, and such construction may be desirable in that would result in saving in the length of the wire 117.

Another modification is shown in Fig. 12 in that the single block 101 has been replaced by two superimposed blocks 120 and 121. The inner surface of the block 120 is the same as that of the block 101, but instead of having either one of these blocks formed with the upwardly extending holes 112 and 113, their meeting faces are respectively provided with half round grooves 122 and 123 within which the insulated wires for connection to the contact spikes are adapted to be received and clamped. The solid block 101 of Fig. 9 can, of course, be used with the detachable flange 96a, and is, in fact, preferable to the grooved plates 120 and 121.

It will be evident from the foregoing that a novel stop light switch for fluid pressure braking systems has been provided, the construction being extremely simple and thoroughly dependable in use. The invention is susceptible of numerous modifications other than those specifically mentioned, and the right is herein reserved to make such changes as fall within the scope of the appended claims without departing from the spirit of the invention.

Having thus described my invention, what I claim is:—

1. A switch of the class described, comprising a casing having a fluid chamber for connection to a source of fluid pressure, a yieldable diaphragm forming one wall of said chamber, resilient switch contacts normally separated from each other, arranged on the opposite side of the diaphragm from the fluid chamber, and adapted for mutual engagement by movement of the diaphragm against one of them, and a plate member attached to the casing, said plate being characterized by a concavity on its inner surface to provide a seat for the diaphragm in its limit of movement, and said diaphragm and contacts being clamped in position between said plate and the casing.

2. In a switch of the class described, a casing having a fluid chamber for connection to a source of pressure fluid, a yieldable diaphragm forming one wall of said fluid chamber, switch contacts normally separated from each other, arranged on the opposite side of the diaphragm from the fluid chamber and adapted for mutual engagement by movement of the diaphragm against one of them, said contacts being insulated from each other, a plate secured to the casing and serving to clamp the diaphragm and the contacts in position, and means on the contacts for connecting the same to electrical conductors as the contacts are assembled with the plate in its clamping position, said plate being formed of dielectric material, and said connecting means being disposed entirely within the confines of the plate.

3. In a switch of the class described, a casing having a fluid chamber, a passage leading to said chamber and adapted to contain liquid, said passage being smaller in area than said chamber and substantially tangent to one edge thereof whereby to eliminate air pockets, a yieldable diaphragm forming one wall of said fluid chamber, resilient switch contacts normally separated from each other, arranged on the opposite side of the diaphragm from the fluid chamber and adapted for mutual engagement by movment of the diaphragm against one of them, and a plate secured to the casing and serving to clamp the diaphragm and contacts in position.

4. In a switch of the class described, a casing having a fluid chamber, a passage leading to said chamber and adapted to contain liquid, a yieldable diaphragm forming a wall of said chamber, said diaphragm being eccentric to and of greater diameter than the interior of the passage, the axis of said passage being arranged eccentrically to the axis of the diaphragm, switch contacts disposed in the path of movement of said diaphragm, one of said contacts being substantially flat and lying against a face of the diaphragm, and a plate secured to the casing and serving to clamp the diaphragm and contacts in position, said plate having radial recesses therein for accommodating the switch contacts.

5. In a switch of the class described, a casing having a fluid chamber for connection to a source of fluid pressure, a yieldable diaphragm forming one wall of said fluid chamber, switch contacts normally separated from each other, and adapted to engage one another upon movement of the diaphragm, said contacts being insulated from each other, a plate secured to the casing and serving to clamp the diaphragm and the contacts in position, said plate being recessed for receiving the ends of insulated wires, and spike members carried by the contacts, said spike members being adapted to extend into said recesses to form electrical contact with the wires, and being further adapted to maintain said switch contacts against displacement.

6. A switch of the class described, comprising a casing having an eccentrically disposed annular flange, a fluid chamber in said casing, a passage in said casing adapted to contain liquid and leading to said chamber, a yieldable diaphragm forming one wall of said chamber, an insulation disk mounted on the outer side of said diaphragm, resilient switch contacts normally separated from each other and adapted for mutual engagement by movement of the diaphragm against one of them, a plate member attached to the casing, said plate being characterized by a concavity on its inner surface to provide a seat for the diaphragm in its limit of movement, and means on the contacts for securing the same to the plate.

HUGH M. ROCKWELL.